(12) United States Patent
Brassel et al.

(10) Patent No.: US 12,460,667 B2
(45) Date of Patent: Nov. 4, 2025

(54) FUNCTIONAL COMPONENT, COMPONENT ASSEMBLY COMPRISING A FUNCTIONAL COMPONENT, AND METHOD FOR SECURING A FUNCTIONAL COMPONENT TO A HOLDING COMPONENT

(71) Applicant: AUDI AG, Ingolstadt (DE)

(72) Inventors: Jan-Oliver Brassel, Bad Friedrichshall (DE); Jochen Rintelmann, Dessau (DE); Jörg Spindler, Überlingen (DE)

(73) Assignee: AUDI AG, Ingolstadt (DE)

( * ) Notice: Subject to any disclaimer, the term of this patent is extended or adjusted under 35 U.S.C. 154(b) by 156 days.

(21) Appl. No.: 18/250,612

(22) PCT Filed: Oct. 1, 2021

(86) PCT No.: PCT/EP2021/077118
§ 371 (c)(1),
(2) Date: Apr. 26, 2023

(87) PCT Pub. No.: WO2022/117245
PCT Pub. Date: Jun. 9, 2022

(65) Prior Publication Data
US 2023/0400047 A1    Dec. 14, 2023

(30) Foreign Application Priority Data

Dec. 3, 2020    (DE) .......................... 102020132184.8

(51) Int. Cl.
*F16B 11/00*    (2006.01)
*F16B 17/00*    (2006.01)

(52) U.S. Cl.
CPC .......... *F16B 11/004* (2013.01); *F16B 17/006* (2013.01)

(58) Field of Classification Search
CPC ..... B21J 15/025; F16B 5/0208; F16B 11/002; F16B 11/004; F16B 19/10; F16B 37/062;
(Continued)

(56) References Cited

U.S. PATENT DOCUMENTS

| 4,138,779 A | * | 2/1979 | Weber ................... F16B 37/048 29/432.1 |
| 4,193,333 A | * | 3/1980 | Hallock .................. F16B 19/00 29/432.1 |

(Continued)

FOREIGN PATENT DOCUMENTS

| DE | 4239584 A1 | * | 5/1994 | ............ F16B 37/068 |
| DE | 102004042478 A1 | | 3/2006 | |

(Continued)

OTHER PUBLICATIONS

Examination Report issued on Jul. 9, 2021, in corresponding German Application No. 102020132184.8, 20 pages.
(Continued)

*Primary Examiner* — Josh Skroupa
(74) *Attorney, Agent, or Firm* — Maier & Maier, PLLC (57) ABSTRACT

A functional component which is designed to be secured to a holding component by pressing a connecting element into a depression of the holding component. In a non-deformed state, the connecting element protrudes in a press-in direction from a base body of the functional component and is designed to be deformed by applying a force to the base body, so that the connecting element is widened in an end area and the end area is introduced into a wall of the depression. The base body includes a contact surface surrounding the connecting element which abuts a support surface of the holding component in a coupled state of the functional component. A functional module of the functional
(Continued)

component is provided by a partial area of the base body facing away from the contact surface.

17 Claims, 4 Drawing Sheets

(58) Field of Classification Search
CPC .............. F16B 37/065; F16B 37/068; Y10T 29/49835; Y10T 29/4992; Y10T 29/5307; Y10T 403/49; Y10T 403/4941; Y10T 403/4949; Y10T 403/4966; Y10T 403/4974; Y10T 403/4991
USPC .............. 403/274, 279, 280, 282, 283, 285; 29/432.1, 512, 716
See application file for complete search history.

(56) References Cited

U.S. PATENT DOCUMENTS

| | | | |
|---|---|---|---|
| 4,729,163 A | 3/1988 | Muller et al. | |
| 4,765,057 A * | 8/1988 | Muller | F16B 37/068 29/716 |
| 4,825,527 A * | 5/1989 | Ladouceur | F16B 37/065 403/283 |
| 5,020,950 A * | 6/1991 | Ladouceur | F16B 37/062 411/107 |
| 5,174,018 A * | 12/1992 | Muller | F16B 37/065 29/512 |
| 5,375,323 A | 12/1994 | Sata | |
| 5,441,417 A * | 8/1995 | Ladouceur | F16B 37/068 411/181 |
| 5,528,812 A * | 6/1996 | Muller | F16B 37/062 29/512 |
| 7,047,617 B2 * | 5/2006 | Ladouceur | F16B 37/062 29/432.1 |
| 7,112,142 B2 * | 9/2006 | Wojciechowski | F16B 37/065 470/25 |
| 7,179,034 B2 * | 2/2007 | Ladouceur | F16B 37/062 29/432.1 |
| 7,425,111 B2 * | 9/2008 | Ladouceur | F16B 37/068 29/432.1 |
| 9,157,464 B2 * | 10/2015 | Ellis | F16B 37/068 |
| 9,172,150 B2 | 10/2015 | Guenter et al. | |
| 9,261,126 B2 * | 2/2016 | Selle | F16B 37/065 |
| 9,764,371 B2 * | 9/2017 | Fujimoto | F16B 37/068 |
| 10,697,484 B2 * | 6/2020 | Pirvulescu | F16B 37/068 |
| 2020/0208674 A1 | 7/2020 | Wang | |
| 2021/0362435 A1 * | 11/2021 | Tuncer | F16B 35/06 |

FOREIGN PATENT DOCUMENTS

| | | | | |
|---|---|---|---|---|
| DE | 102009032083 A1 | 1/2011 | | |
| DE | 102014011599 A1 | 2/2016 | | |
| DE | 102015014941 A1 | 5/2017 | | |
| DE | 102016119478 A1 | 4/2018 | | |
| DE | 102017110806 A1 | 11/2018 | | |
| EP | 0842733 A2 * | 5/1998 | ............ | F16B 37/068 |
| EP | 1717460 A1 | 11/2006 | | |
| EP | 2088338 A2 * | 8/2009 | ............ | F16B 37/062 |
| GB | 1326125 A | 8/1973 | | |

OTHER PUBLICATIONS

International Search Report and Written Opinion issued on Jan. 5, 2022, in corresponding International Application No. PCT/EP2021/077118, 16 pages.
International Preliminary Report on Patentability issued on Jul. 25, 2022, in corresponding International Application No. PCT/EP2021/077118, 15 pages.
Office Action issued on Jun. 14, 2025, in corresponding Chinese Application No. 202180081342.9, 9 pages.

* cited by examiner

FUNCTIONAL COMPONENT, COMPONENT ASSEMBLY COMPRISING A FUNCTIONAL COMPONENT, AND METHOD FOR SECURING A FUNCTIONAL COMPONENT TO A HOLDING COMPONENT

FIELD

The invention relates to a functional component which is designed to be secured to a holding component by pressing a connecting element of the functional component into a depression provided in the holding component. In a non-deformed state, the connecting element protrudes in a press-in direction from a base body of the functional component and is designed to be converted into a deformed state by applying a force acting in the press-in direction to the base body. In the deformed state, the connecting element is widened in a free end area, and the free end area of the connecting element is introduced into a wall of the holding component, which delimits the depression of the holding component in the circumferential direction. Furthermore, the invention relates to a composite component having at least one such functional component and a holding component as well as a method for securing a functional component to a holding component.

BACKGROUND

DE 10 2004 042 478 A1 describes a method for fastening a functional component such as a press-in bolt to a further component in a torsion-proof manner. In this case, the further component includes a receptacle opening designed as a blind hole. The cylindrical press-in bolt has a deforming area at its one front end, which is formed by a ring-like foot having a central and inwardly directed curvature. During the setting process, the press-in bolt is pressed into the blind hole. In this case, the foot is deformed outwards and penetrates into the side wall of the blind hole.

The circumstance that an end position of the press-in bolt cannot be specified in a well reproducible manner is considered disadvantageous here. As a result, the press-in process can only be repeated with unsatisfactory accuracy.

Furthermore, DE 10 2017 110 806 A1 describes a form-fitting connection of components of a transmission in the form of a cast support and a cover to one another. In this case, the formfitting connection is produced by means of a stamp, which plastically displaces material of a rivet head of the cover into an undercut, which is formed in the cast support.

SUMMARY

The object of the present invention is to create a functional component of the type mentioned at the outset, in which precise securing on the holding component can be implemented in a particularly well reproducible manner, and to specify a corresponding composite component and a corresponding method.

The functional component according to the invention is designed to be secured to a holding component, specifically by pressing a connecting element of the functional component into a depression provided in the holding component. In a non-deformed state, the connecting element protrudes in a press-in direction from a base body of the functional component. In this case, the press-in direction is that direction in which the connecting element is pressed into the depression of the holding component in order to secure the functional component to the holding component. The connecting element is designed to be converted into a deformed state by applying a force acting in the press-in direction to the base body. In the deformed state of the connecting element, the connecting element is widened in a free end area. Furthermore, in the deformed state of the connecting element, the free end area of the connecting element is introduced into a wall of the holding component delimiting the depression of the holding component in the circumferential direction. The base body of the functional component includes a contact surface extending around the connecting element. In a coupling state of the functional component, in which the functional component is secured to the holding component by pressing the connecting element into the depression, the contact surface abuts a support surface of the holding component. A functional module of the functional component is provided by a partial area of the base body facing away from the contact surface.

The provision of the contact surface extending around the connecting element on the base body ensures in the functional component that when the connecting element is pressed into the depression of the holding component, a defined end location or end position of the functional component is specified. This is because the functional component reaches this end location or end position when the contact surface of the functional component abuts the support surface of the holding component. Therefore, in the case of the functional component, precise securing to the holding component can be implemented in a particularly well reproducible manner.

In addition, the provision of the functional module of the functional component by the partial area of the base body facing away from the contact surface ensures that the functional component can fulfill a function intended for it. This function can in particular involve securing a further component to the functional component. The functional component can therefore be used advantageously in particular in a motor vehicle. This is because in motor vehicle construction, one is regularly confronted with the task of arranging further components on a functional component or connecting a further component to the functional component in a simple manner, wherein the functional component is in turn secured to the holding component.

Due to the provision of the contact surface, a very repeatable seat of the functional component or press-in element in relation to the holding component and in particular the support surface of the holding component can be achieved when the functional component is secured to the holding component, which is carried out here by pressing the connecting element into the depression. This applies on the one hand with regard to an alignment of the functional module relative to the support surface of the holding component. In particular, it is very easy to ensure that a central axis of the functional module, which preferably coincides with the press-in direction, is essentially perpendicular in relation to the support surface of the holding component.

Moreover, the contact surface of the functional component provides an end stop for the press-in process, so that a predetermined longitudinal extension or height of the functional module in relation to the contact surface of the holding component can be maintained or set in a very well reproducible and precise manner.

Furthermore, by specifying a distance from the contact surface of the free end area, which widens or spreads when the connecting element is pressed into the depression, it can be very well predetermined at which point on the wall delimiting the depression of the holding component in the circumferential direction a force is introduced into the holding component. The introduction of the expansion force of the free end area of the connecting element, which is designed like a spreading foot, into the holding component in the area of the depression of the holding component can thus be deliberately set very well such that good force absorption by the holding component is ensured.

This ensures very secure anchoring of the functional component on the holding component by means of the connecting element, which is spread or widened in the free end area. Furthermore, it can be avoided very reliably in this way that, as a result of the connection of the functional component to the holding component by being pressed in, there is undesired damage or even failure of the holding component.

In addition, the functional component can be secured to the holding component very easily by force-controlled pressing of the connecting element into the depression. This is because when the connecting element is pressed into the depression, the free end area of the connecting element that can be widened or spread first comes into contact with a base or a bottom area of the depression. Subsequently thereto, the free end area of the connecting element is then clamped in the wall of the holding component, which delimits the depression of the holding component in the circumferential direction.

This penetration of the free end area into the wall of the holding component ensures a particularly intimate and secure connection of the functional component to the holding component. And the abutting of the contact surface of the base body on the contact surface of the holding component is noticeable when pressing in due to a sudden increase in the force to be applied to the base body when pressing in. It can thus be established very well on the basis of this increase in force when the press-in process has ended or has been completed.

Depending on the embodiment of the functional module, different functions can be provided by the functional component. Nevertheless, the connection to the functional component does not have to be carried out already during the manufacturing of the holding component. Rather, for example, the holding component can include a plurality of depressions, and only the depressions desired in a specific application are then equipped with the respective functional component.

This is particularly advantageous with regard to implementing a plurality of variants based on the same holding component, wherein the variants can differ in particular in the location of the attachment of the functional components and/or in the type of the functional components. Therefore, there is a particularly high level of flexibility when providing a composite component in which the holding component is equipped with at least one functional component.

The functional module is preferably designed to produce a welded connection of the functional component to a further component. Accordingly, the functional module can be designed as a partial area of the base body, in which the base body has the shape of a plate or another contour or the like suitable for welding, in particular spot welding. In particular, the contact surface can be formed on a first side of this plate, on which the connecting element protrudes from the base body. A welding surface can then be provided by a second side of the plate opposite to the contact surface, on which the further component can be connected to the functional component by welding, in particular by spot welding. Such an embodiment of the functional component is particularly advantageous when the holding component is formed from a non-weldable material, while the material of the functional component is suitable for producing a welded connection.

Additionally or alternatively, the functional module can comprise a pin-shaped extension which is aligned with the connecting element. In this case, the contact surface is formed on a side of a collar-like web of the functional component facing away from the pin-shaped extension. The web extends around the pin-shaped extension. In such an embodiment, the force used for pressing in can be applied very well and very evenly to the web during pressing in, specifically to the side of the web facing away from the contact surface or opposite to the contact surface. This is advantageous with regard to a very uniform introduction of force and thus also uniform pressing of the connecting element into the depression of the holding component. Furthermore, the pin-shaped extension of the functional module can be used very advantageously, in particular for securing at least one further component to the functional component.

The pin-shaped extension can include an end area which is widened in relation to a shaft area of the pin-shaped extension. Accordingly, the functional module can be designed overall, for example, in the manner of a ball pin or such an area of the functional component that has a rear-lockable contour. Such a functional module is well suited for securing a further component to the functional component.

Additionally or alternatively, the pin-shaped extension can include an external thread. This is also advantageous with regard to securing a further component to the functional component via the functional module.

The external thread can in particular be designed as a metric thread or metric ISO thread, so that a nut or similar element provided with a corresponding metric thread can be attached to the functional module very easily and reliably in the process.

Alternatively, the external thread can be designed as a coarse thread, in which in particular greater distances between thread turns of the thread can be provided than when the external thread is designed as a metric ISO thread. Such a coarse thread is also well suited for attaching a further component to the functional component via the functional module.

The web preferably includes at least one projection which protrudes from the contact surface in the press-in direction. Such a projection, designed for example in the manner of a nub or the like, penetrates into the holding component during the press-in process until the contact surface of the base body abuts the contact surface of the holding component. This ensures that the functional component is anchored particularly well on the holding component.

In particular, when the functional module includes the pin-shaped extension provided with the external thread, the at least one projection fulfills a further advantageous purpose. This is because the at least one projection pressed into the holding component ensures protection against rotation, for example when a further component in the form of a nut or the like is screwed together with the pin-shaped extension having the external thread. Due to the provision of the at least one projection, torsional forces occurring during such screwing can be absorbed particularly well by the holding component or introduced into the holding component.

One end face of the free end area is preferably formed inclined in relation to the contact surface. In this case, an inner edge of the end face is closer to the contact surface than an outer edge of the end face. Such a beveled design of the free end area on its end face can ensure in a particularly effective manner that the connecting element widens or spreads open in the free end area when the connecting element is pressed into the depression. This in turn ensures, in a process-reliable manner, that the free end area cuts into the wall of the holding component or penetrates into the wall which delimits the depression of the holding component in the circumferential direction.

In the non-deformed state, the connecting element preferably has an indentation in the free end area, which is delimited in the circumferential direction by a wall of the connecting element. Such an embodiment of the connecting element can very reliably ensure that the free end area widens or spreads when the connecting element is pressed into the depression.

It can be provided that by bringing the connecting element into the deformed state, a bottom area of the indentation can be brought into contact with a bottom area or base of the depression. This contributes to a particularly intimate connection of the functional component to the holding component.

The composite component according to the invention includes at least one functional component according to the invention and a holding component. The at least one functional component is secured to the holding component by pressing the connecting element into at least one depression which is provided in the holding component.

The holding component is preferably made of a softer material than the at least one functional component, at least in the area of the depression. In this way, it can be reliably ensured that the free end area of the connecting element, which spreads when it is pressed in, enters or penetrates into the wall of the holding component, which delimits the depression formed in the holding component in the circumferential direction. In this way, the at least one functional component can be secured very securely to the holding component.

In particular, the holding component can be designed as a die-cast component. This is advantageous with regard to precise manufacturing of the holding component. Furthermore, by designing the holding component as a die-cast component, it can be ensured well that the holding component is formed from a softer material than the at least one functional component, at least in the area of the depression. This applies in particular if the die-cast component is formed from an aluminum alloy. Furthermore, the functional component can be formed in particular from steel.

The depression can be introduced into the holding component in different ways, for example by machining, in particular by drilling.

The at least one depression in the holding component can be provided with particularly little effort if the depression is already formed during the production of the holding component as a die-cast component. In particular when the holding component is designed as a die-cast component, it has proven to be advantageous if the at least one depression has the shape of a truncated cone that widens counter to the press-in direction. Because then, when producing the holding component as a die-cast component, the holding component can very well be demolded or removed from a mold counter to the press-in direction.

In the deformed state of the connecting element, an intermediate space is preferably formed between an outer side of the connecting element and a wall of the holding component delimiting the depression of the holding component in the circumferential direction. Such an intermediate space, which is designed in particular in the manner of an air pocket, can very well compensate for stresses that can occur as a result of different thermal expansions of the functional component and the holding component. For example, this is advantageous when the functional component is formed from a steel and the holding component is a die-cast component formed from an aluminum alloy.

In the method according to the invention for securing a functional component, provided in particular for a motor vehicle, on a holding component by pressing a connecting element of the functional component into a depression provided in the holding component, the connecting element protrudes in a press-in direction from a base body of the functional component when the connecting element is in a non-deformed state. The connecting element is designed to be converted into a deformed state by applying a force acting in the press-in direction to the base body. In the deformed state of the connecting element, the connecting element is widened in a free end area. During this widening or spreading of the free end area, the free end area of the connecting element is introduced into a wall of the holding component, which delimits the depression of the holding component in the circumferential direction. The base body of the functional component has a contact surface which extends around the connecting element and which is brought into contact with a contact surface of the holding component to bring about a coupled state of the functional component. In the coupled state of the functional component, the functional component is secured to the holding component by pressing the connecting element into the depression. A functional module of the functional component is provided by a partial area of the base body facing away from the contact surface.

By means of such a method, a precise securing of the functional component to the holding component can be implemented in a particularly well reproducible manner.

A length of the connecting element in the press-in direction is preferably reduced to a length which corresponds to a depth of the depression by converting the connecting element into the deformed state. Accordingly, the length of the connecting element in the press-in direction is preferably greater than the depth of the depression when the connecting element is in the non-deformed state. In this way, a very resilient connection of the functional component to the holding component can be achieved in that the free end area of the connecting element penetrates into the wall of the holding component, which delimits the depression of the holding component in the circumferential direction.

The advantages and preferred embodiments described for the functional component according to the invention and the composite component according to the invention also apply to the method according to the invention and vice versa.

The invention accordingly in particular also includes refinements of the method according to the invention, which have features as already described in the context of the refinements of the functional component according to the invention and the composite component according to the invention. For this reason, the corresponding refinements of the method according to the invention are not described again here.

The invention also comprises the combinations of the features of the described embodiments. The invention also includes implementations that each have a combination of the features of several of the described embodiments, unless the embodiments were described as mutually exclusive.

BRIEF DESCRIPTION OF THE FIGURES

Exemplary embodiments of the invention are described hereinafter. In the figures.

DETAILED DESCRIPTION

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

Figure 1:
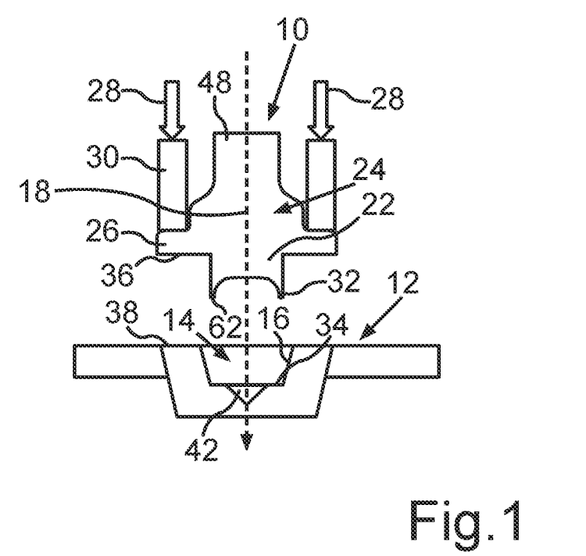
FIG. 1 shows a first step in securing a functional component to a holding component, wherein the holding component is designed as a die-cast component formed from an aluminum alloy.

FIG. 1 very schematically shows a functional component 10 for a motor vehicle, which is to be connected to a holding component 12 or secured to the holding component 12. In the present case, the holding component 12 is designed as a die-cast component formed from an aluminum alloy. When the holding component 12 is manufactured by die-casting the aluminum alloy, that is to say by aluminum die-casting, a depression 14 designed in the manner of a blind hole is also produced in the holding component 12. In this regard, it can be seen from FIG. 1 that a wall 16, which delimits the depression 14 in the circumferential direction, is designed to be inclined. Accordingly, the wall 16 has a demolding bevel which facilitates the demolding of the holding component 12 from a die-casting mold (not shown).

Alternatively, the depression 14 can be designed as a blind hole, which is produced in the holding component 12 in particular by drilling or similar machining. In such a case in particular, the wall 16 of the blind hole can be formed straight or parallel to a press-in direction 18 which is illustrated in FIG. 1 by an arrow. The press-in direction 18 also coincides with a longitudinal axis of the functional component 10.

Figure 3:
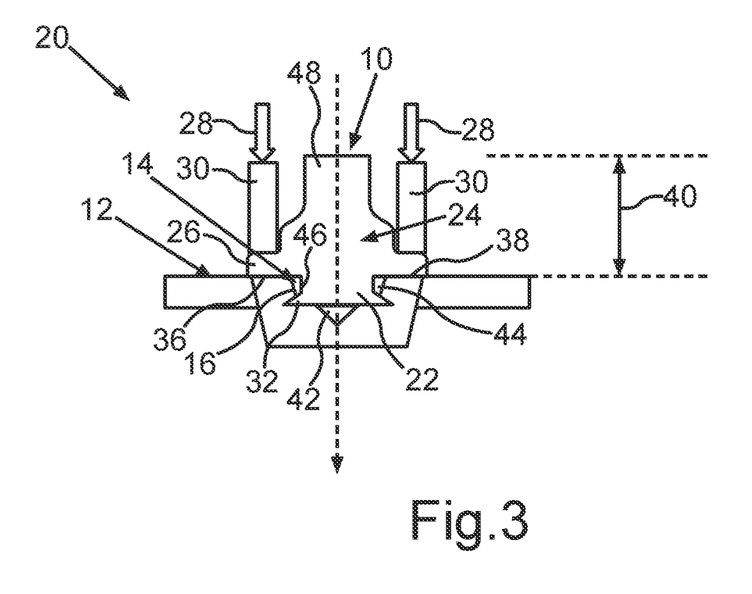
FIG. 3 shows a further step in connecting the functional component to the holding component, wherein the functional component has reached its end location or end position and an end area of the connecting element has penetrated into a wall which peripherally delimits the depression formed in the holding component.

To produce a composite component 20 shown in FIG. 3, which comprises the functional component 10 and the holding component 12, a connecting element 22 of the functional component is pressed into the depression 14 which is formed in the holding component 12. The connecting element 22 protrudes from a base body 24 of the functional component 10 in the press-in direction 18. The connecting element 22, which is designed in the manner of an extension, is shown in FIG. 1 in a state that has not yet been deformed.

To secure the functional component 10 to the holding component 12 by pressing the connecting element 22 into the depression 14, a force is applied to a collar-like web 26 of the functional component 10. This force is illustrated by arrows 28 in FIG. 1. In particular, the force can be applied to the web 26 via a pressure piece 30, which is shown schematically in FIG. 1 and which can be designed in particular as a circular cylinder.

Figure 2:
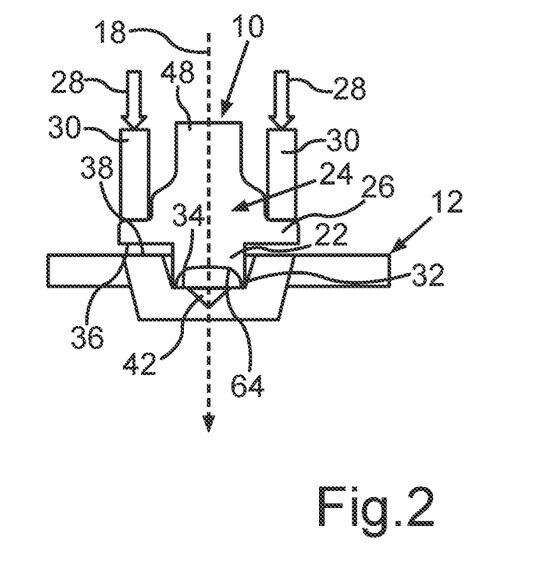
FIG. 2 shows a further step in securing the functional component to the holding component, wherein a connecting element of the functional component is in contact with a base of a depression which is formed in the holding component.

By applying this force acting in the press-in direction 18 to the base body 24 and especially to the web 26 in the present case, it is first ensured that a free end area 32 of the connecting element 22 comes into contact with a bottom area or base 34 of the depression 14 (cf. FIG. 2). The pressing of the connecting element 22 into the bore or depression 14 is preferably force-controlled.

When the connecting element 22 is pressed into the depression 14, the free end area 32 of the connecting element 22, designed in the manner of a spreading foot, first comes into contact on the base 34 of the depression 14. In this state, shown in FIG. 2, however, a contact surface 36 of the base body 24 extending around the connecting element 22 is still spaced apart from a support surface 38 of the holding component 12. The press-in process is then continued. This continues until the collar-like web 26 or collar of the functional component 10 comes into contact with the holding component 12. Accordingly, the contact surface 36 of the functional component 10, which is presently formed on the web 26 or collar, then also abuts, in particular flatly, the support surface 38 of the holding component 12. This state, in which the component assembly 20 is formed or produced, is shown in FIG. 3.

Pressing the connecting element 22 into the depression 14 results in the free end area 32 of the connecting element 22 being converted into a state shown in FIG. 3, in which the free end area 32 is deformed. This deformed state of the connecting element 22 is schematically illustrated in FIG. 3. Accordingly, the free end area 32 of the connecting element 22, which is designed in the manner of a spreading foot, is clamped in the depression 14 or bore of the cast part or holding component 12. In other words, the free end area 32 penetrates into the wall 16 which delimits the depression 14 of the holding component 12 in the circumferential direction. This penetration or this introduction of the free end area 32 into the wall 16, which delimits the depression 14 of the holding component 12 in the circumferential direction, is shown schematically in FIG. 3.

An end stop for the pressing process or press-in process is provided by the web 26 or collar, which extends around the connecting element 22 in the present case and on which the contact surface 36 is formed. This results in a very repeatable process when connecting the functional component 10 to the holding component 12 by pressing the connecting element 22 into the depression 14. This is because after the collar or web 26 has been placed on the surface or support surface 38 of the holding component 12, there is a clearly noticeable increase in force. This indicates that the press-in process is complete.

Furthermore, a very repeatable seat of the press-in element or functional component 10 in relation to the surface of the holding component 12 or cast component can be achieved, both with regard to the angle and with regard to a height 40 of the functional component 10 above the support surface 38. This is because on the one hand it can be ensured by the collar or web 26 that the functional component 10 is aligned straight in relation to the holding component 12, i.e., such that the press-in direction 18 and thus the longitudinal axis of the functional component 10 extends, for example, perpendicularly to the support surface 38 of the holding component 12. For this purpose, the contact surface 36 is also formed perpendicular to the press-in direction 18 in the present case. Furthermore, during this press-in process, the height 40 of the functional component 10 in relation to the support surface 38 is also specified very precisely, which in the present case corresponds to a distance between an upper end of the base body 24 and the support surface 36.

In addition, the expansion force of the free end area 32 or spreading foot is introduced into the cast component or holding component 12 in the area of the base 34 of the bore or depression 14. In this way, very good force absorption can be achieved via the cast component or holding component 12.

Furthermore, in the present case, the functional elements or functional components 10 are introduced independently of the production of the holding component 12, which is carried out in the present case by die-casting the aluminum alloy. It is therefore not necessary, for example, for a functional element or functional component 10 to already be inserted into the mold at a desired point during die casting in order to achieve the connection to the cast component or holding component 12. Rather, respective depressions 14 can first be provided in the holding component 12 at a plurality of points, and only the depression 14 required for a specific intended application is then equipped with the corresponding functional component 10.

It is also apparent, for example from FIG. 1, that a further bore 42 or depression can be formed on the base 34 of the depression 14. Overall, the depression 14 can thus be designed in the manner of a stepped bore. The further bore 42 can be provided in particular in order to locally reduce a wall thickness of the holding component 12. This can be useful in order to avoid the formation of sink marks or the like upon cooling of the holding component 12, which is in the present case designed as an aluminum die-cast part.

It is apparent in particular from FIG. 3 that an intermediate space 44 can be formed between an outer side 46 of the connecting element 22 and the wall 16 of the holding component 12 delimiting the depression 14 of the holding component 12 in the circumferential direction. This intermediate space 44, which is designed in the manner of an air pocket, ensures that stresses due to different thermal expansions of the material of the functional component 10 and the material of the holding component 12 can be compensated for. This is advantageous, for example, when the functional component 10 is formed from steel.

In FIG. 1 to FIG. 3 the functional component 10 is only shown very schematically. Accordingly, the functional component 10 includes a functional module 48 which is provided by a partial area of the base body 24 facing away from the contact surface 36. Depending on the design of this functional module 48, the functional component 10 can provide different functions. This is to be clarified with reference to the following figures.

Figure 4:
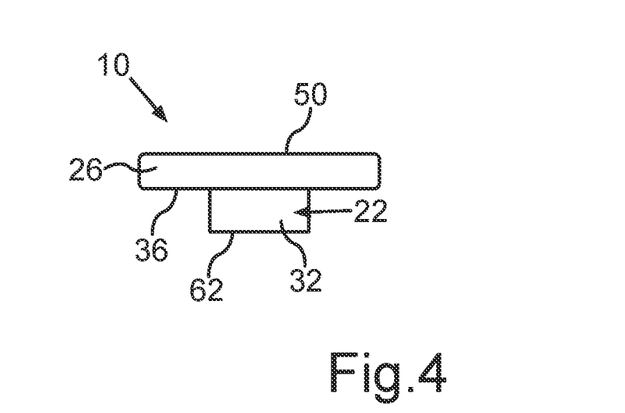
FIG. 4 shows an exemplary embodiment of the functional component as a spot welding foot.

For example, according to FIG. 4, the functional component 10 can be designed as a welding foot for producing a connection by spot welding. In this case, a surface 50 of the functional component 10 opposite to the contact surface 36 of the collar-like web 26 or collar is formed flat. A connection of a further component (not shown) to the component assembly 20 can be established on this planar surface 50 in the present embodiment shown as an example, which comprises the functional component 10 shown in FIG. 4 and the holding component 12 to which the functional component 10 is secured. The surface 50 can also have a shape or form deviating from the planar shape in order to be suitable for establishing a connection to the further component (not shown) by welding, in particular by spot welding.

In contrast, in the embodiments of the functional component 10 shown schematically in FIG. 1 to FIG. 3, the functional module 48 includes an extension or projection which is aligned with the connecting element 22 and is formed or arranged on a side of the web 26 which is opposite to the contact surface 36. In other words, in this functional component 10 the contact surface 36 is formed on that side of the web 26 which faces away from or is opposite to the extension or projection.

Figure 5:
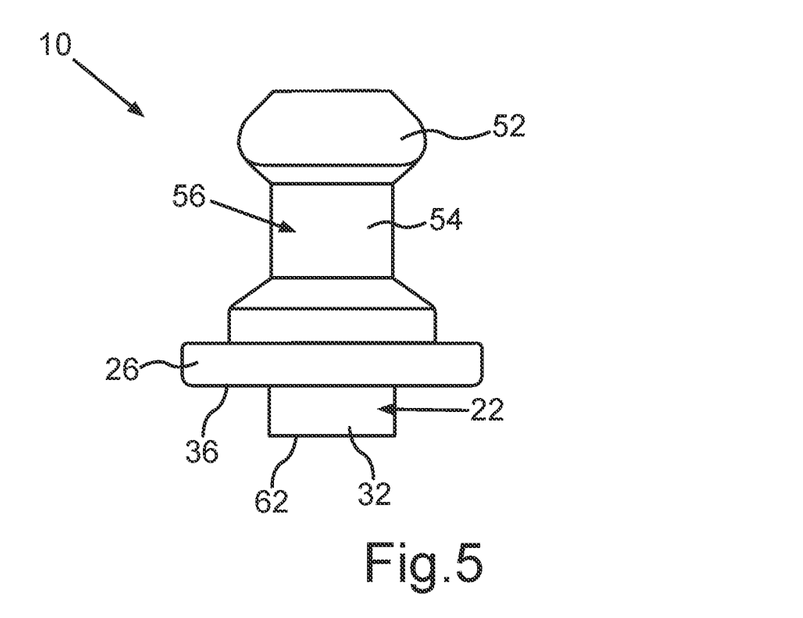
FIG. 5 shows a further exemplary embodiment of the functional component as a ball pin.

Further exemplary embodiments of the functional component 10 are to be illustrated with reference to FIG. 5 to FIG. 7, in which the functional component 10 includes such a substantially pin-shaped extension 56. Thus, in the embodiment of the functional component 10 shown as an example in FIG. 5, the pin-shaped extension 56 includes a head-shaped end area 52, which is widened in relation to a shaft area 54 of the pin-shaped extension 56. Accordingly, the functional component 10 shown in FIG. 5 is designed in the manner of a ball pin, by which a latching function can be provided. Instead of the head-shaped end area 52 shown here as an example, the functional component 10 can also include another contour suitable for a latching behind or latching of a further component with the composite component 20.

Figure 6:
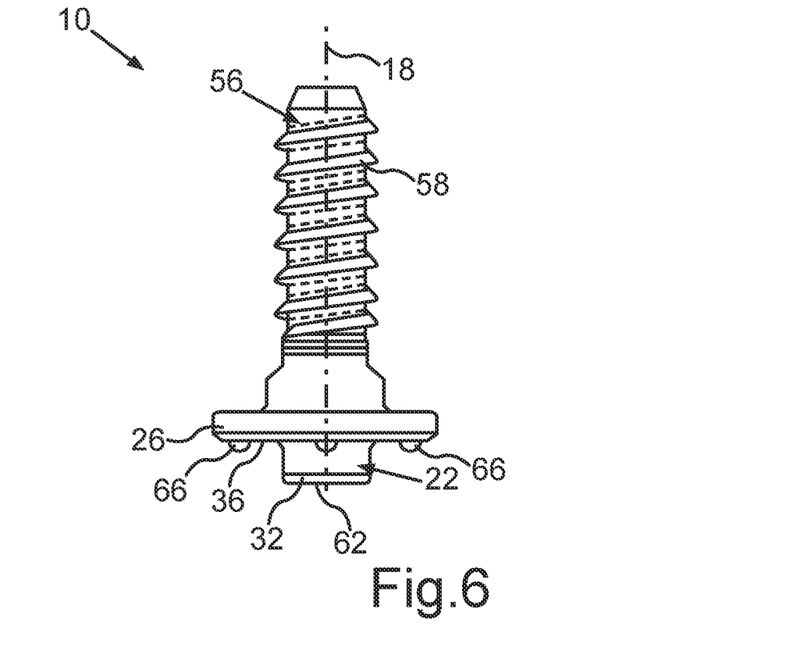
FIG. 6 shows a further exemplary embodiment of the functional component as a coarse threaded pin.

In the embodiment of the functional component 10 shown in FIG. 6, the pin-shaped extension 56 has an external thread designed as a coarse thread 58.

Figure 7:
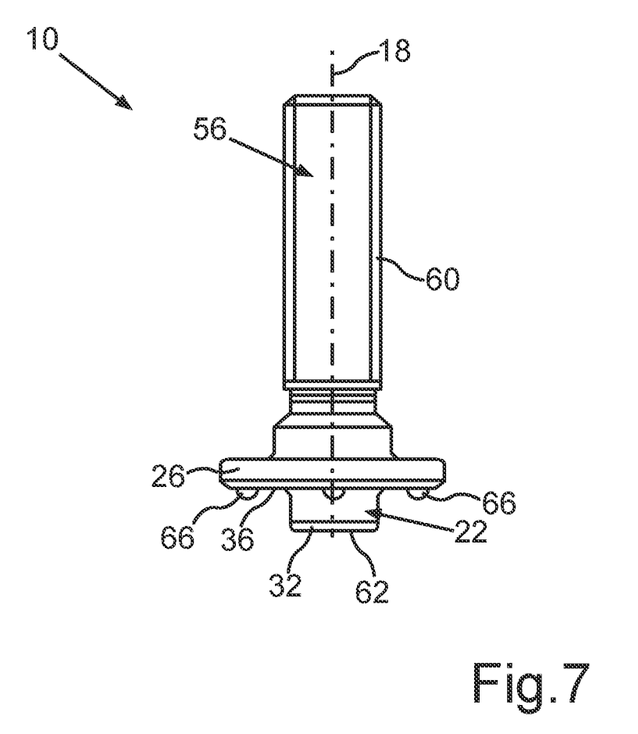
FIG. 7 shows a further exemplary embodiment of the functional component as a threaded pin having a metric thread.

In contrast, in the functional component 10 shown in FIG. 7, the pin-shaped extension 56 includes an external thread, which is designed as a metric thread 60.

Both in the functional component 10 shown in FIG. 6 and in the functional component 10 shown in FIG. 7, projections designed as nubs 66 are arranged on a lower side of the web 26 or collar facing toward the support surface 38 of the holding component 12 the composite component 20 (cf. FIG. 3), which protrude in the press-in direction 18 from the lower side or contact surface 36 of the web 26.

When the functional component 10 is connected to the holding component 12 by being pressed in, these nubs 66 penetrate into the holding component 12 until the contact surface 36 of the base body 24 is in contact with the support surface 38 of the holding component 12. By providing these nubs 66 or at least one such projection, torsional forces in particular, which occur when screwing another component (not shown), such as a nut together with the external thread of the functional component 10, can be introduced well into the holding component 12. The nubs 66 thus provide an anti-twist device for the functional component 10 in the composite component 20 (cf. FIG. 3).

In a manner not shown in detail here, an end face 62 (cf. FIG. 1) of the free end area 32 can be formed inclined in relation to the contact surface 36. In this case, an inner edge of the end face 62 is preferably closer to the contact surface 36 than an outer edge of the end face 62. This inclined geometry of the end face 62 of the free end area 32 is particularly effective in ensuring that the connecting element 22 spreads in the free end area 32 and thus penetrates into the wall 16 after the outer edge of the end face 62 has come into contact with the base 34 of the depression 14 (cf. FIG. 2).

It is furthermore apparent from FIG. 1 and FIG. 2 in particular that the connecting element 22 has an indentation 64 in the free end area 32 in the not yet deformed state, which is delimited in the circumferential direction by a wall of the connecting element 22. This indentation 64 also contributes to the fact that when the connecting element 22 is pressed into the depression 14, the connecting element 22 can spread or widen well in the free end area 32.

Overall, the examples show how functional elements or functional components 10 can be provided for the holding component 12 in the form of the aluminum die-cast part in an advantageous manner.

The invention claimed is:

1. A composite component having
at least one functional component for a motor vehicle, and having a holding component,
wherein the functional component is secured to the holding component by pressing a connecting element of the functional component into a depression provided in the holding component,
wherein the connecting element protrudes from a base body of the functional component in a press-in direction in a non-deformed state and is designed to be converted into a deformed state by applying a force acting in the press-in direction to the base body, in which the connecting element is widened in a free end area and the free end area of the connecting element penetrates a wall of the holding component delimiting the depression of the holding component in the circumferential direction,
wherein the base body of the functional component includes a contact surface extending around the connecting element which, in a coupled state of the functional component, in which the functional component is secured to the holding component by pressing the connecting element into the depression, abuts a support surface of the holding component,
wherein a functional module of the functional component is provided by a partial area of the base body facing away from the contact surface;
wherein the functional module, designed in particular to secure a further component to the functional component, is designed to produce a welded connection of the functional component to a further component and comprises a pin-shaped extension which is aligned with the connecting element, wherein the contact surface is formed on a side of a collar-like web of the functional component facing away from the pin-shaped extension and extending around the pin-shaped extension; and
wherein the at least one depression has the shape of a truncated cone that widens counter to the press-in direction.

2. The composite component as claimed in claim 1, wherein the pin-shaped extension includes an end area which is widened in relation to a shaft area of the pin-shaped extension, and includes an external thread, in particular designed as a coarse thread or as a metric thread.

3. The composite component as claimed in claim 2, wherein an end face of the free end area is designed to be inclined in relation to the contact surface, wherein an inner edge of the end face is closer to the contact surface than an outer edge of the end face.

4. The composite component as claimed in claim 2, wherein in the non-deformed state, the connecting element includes an indentation in the free end area, which is delimited in the circumferential direction by a wall of the connecting element.

5. The composite component as claimed in claim 2, wherein the holding component is formed from a softer material than the at least one functional component, at least in the area of the depression.

6. The composite component as claimed in claim 1, wherein an end face of the free end area is designed to be inclined in relation to the contact surface, wherein an inner edge of the end face is closer to the contact surface than an outer edge of the end face in the non-deformed state.

7. The composite component as claimed in claim 6, wherein in the non-deformed state, the connecting element includes an indentation in the free end area, which is delimited in the circumferential direction by a wall of the connecting element.

8. The composite component as claimed in claim 6, wherein the holding component is formed from a softer material than the at least one functional component, at least in the area of the depression.

9. The composite component as claimed in claim 1, wherein in the non-deformed state, the connecting element includes an indentation in the free end area, which is delimited in the circumferential direction by a wall of the connecting element.

10. The composite component as claimed in claim 9, wherein the holding component is formed from a softer material than the at least one functional component, at least in the area of the depression.

11. The composite component as claimed in claim 1, wherein the holding component is formed from a softer material than the at least one functional component, at least in the area of the depression.

12. The composite component as claimed in claim 1, wherein the holding component is a die-cast component formed from an aluminum alloy, and/or the at least one depression has the shape of a truncated cone that widens counter to the press-in direction.

13. The composite component as claimed in claim 1, wherein in the deformed state of the connecting element, an intermediate space is formed between an outer side of the connecting element and a wall of the holding component delimiting the depression of the holding component in the circumferential direction.

14. The composite component as claimed in claim 1, wherein an end face of the free end area is designed to be inclined in relation to the contact surface, wherein an inner edge of the end face is closer to the contact surface than an outer edge of the end face in the non-deformed state.

15. The composite component as claimed in claim 1, wherein in the non-deformed state, the connecting element includes an indentation in the free end area, which is delimited in the circumferential direction by a wall of the connecting element.

16. The composite component as claimed in claim 1, wherein the holding component is formed from a softer material than the at least one functional component, at least in the area of the depression.

17. The composite component as claimed in claim 1, wherein the holding component is a die-cast component formed from an aluminum alloy.

* * * * *